United States Patent
Moehler et al.

[19]

[11] Patent Number: 6,037,583
[45] Date of Patent: Mar. 14, 2000

[54] CONTROL SYSTEM FOR A SCANNER DRIVE

[75] Inventors: Gunter Moehler; Guenter Schoeppe, both of Jena; Sebastian Tille, Marburg, all of Germany

[73] Assignee: Carl Zeiss Jena GmbH, Jena, Germany

[21] Appl. No.: 09/010,079

[22] Filed: Jan. 21, 1998

[30] Foreign Application Priority Data

Jan. 27, 1997 [DE] Germany .......................... 197 02 752

[51] Int. Cl.$^7$ ..................................... H01J 3/14
[52] U.S. Cl. .......................... 250/235; 250/230; 359/199; 359/221
[58] Field of Search ................................ 250/234, 235, 250/236, 214 R, 230; 359/198, 199, 212, 213, 221; 358/494

[56] References Cited

U.S. PATENT DOCUMENTS

| | | |
|---|---|---|
| 4,800,270 | 1/1989 | Blais . |
| 5,187,364 | 2/1993 | Blais ....................................... 250/236 |

OTHER PUBLICATIONS

GIT Fachz. Lab Sep. 1984, Article "Laser–Scan–Mikroskop—Aufbau und Anwendungen" (Apparatus and Applications) V.Wilke and A. Siegel (pp. 765–766, 771–772).
Laser Magazin Mar. 1986, Article "Von Low–Cost bis High–Tech: Laser—Scanner finden ihren Markt" K. Dickmann (pp. 10,12,14, 16 and 18).
R. Oldenbourg Verlag Muenchen Wein 1977, Elektronische Signalverarbeitung "Mit 215 Bilden und 46 Tabellen" H. Vahidiek (pp. 220–221).

*Primary Examiner*—Edward P. Westin
*Assistant Examiner*—Kevin Pyo
*Attorney, Agent, or Firm*—McAulay Nissen Goldberg Kiel & Hand, LLP

[57] ABSTRACT

A control system for a scanner is disclosed, especially for a laser scanning microscope, with an oscillating motor for driving an oscillating mirror serving for the linearly oscillating deflection of a beam bundle, with a control unit for supplying the oscillating motor with an exciting current which is variable with respect to the control frequency, frequency curve, and amplitude, with a function generator which is connected with the control unit, and with a measurement value transducer for obtaining a sequence of information about the deflection positions of the oscillating mirror.

The measurement value transducer is connected with the function generator by way of a logic unit for determining correction values for the exciting current. Accordingly, it is advantageously possible, by evaluating the information supplied by the measurement value transducer about the actual deflection position of the oscillating mirror, to determine correction values with the assistance of the logic unit. These correction values can be used, in turn, to influence the control frequencies emitted by the function generator in such a way that deviations are minimized or completely prevented.

12 Claims, 2 Drawing Sheets

CONTROL SYSTEM FOR A SCANNER DRIVE

BACKGROUND OF THE INVENTION a) Field of the Invention

The invention is directed to a control system for a scanner drive, especially for a laser scanning microscope, with an oscillating motor for driving an oscillating mirror serving for the linearly oscillating deflection of a beam bundle, with a control unit for supplying the oscillating motor with exciting current which is variable with respect to control frequency, frequency curve, and amplitude, with a function generator which is connected with the control unit, and with a measurement value transducer for obtaining a sequence of information about the deflection positions of the oscillating mirror.

b) Description of the Related Art

Optical devices with scanning arrangements, including laser scanning microscopes, are known in principle in the art. A laser which focusses light along a beam path onto a small light point, generally called a pixel, in a focal plane is typically used as a radiation source. In this way, virtually all of the laser light is guided to this individual target point.

The scanning device of an instrument of the kind mentioned above serves for the linear deflection of the light coming from the laser as well as the light reflected from the object plane and, in this respect, for moving the light point in the image plane or in the object plane. A raster scanning device which is controlled synchronously with the scanner emits the resulting detector output signal as image information.

For oscillating deflection of the beam path, it is known to provide electromechanically driven mirrors and to deflect the beam path in such a way that the target point moves in the direction of an axis which will be called the x-axis. For this purpose, the mirror can direct the laser bundle onto a second mirror which is driven in the same way and which causes a movement of the target point in the direction of an orthogonal axis, the y-axis.

The deflection in the x-axis will be considered more closely in the following. Although the deflecting mirrors that are used have smaller dimensions and accordingly have less mass, the problem in such scanning devices consists in always generating fast and accurate mirror movements for the purpose of good image linearity with short image formation times. This is because the mirror movement or beam path follows the drive signals emitted by the control unit with only varying degrees of faithfulness due to different interference influences. This is not adequate for a highly efficient scanning device in which the demand for high scanning frequency must always be met and in which it is required that the target point maintains a constant speed over the entire deflection phase.

In order to obtain drive characteristics for the deflecting mirror which are as linear as possible, a control signal with a triangular wave is generated in the control unit. The phases and amplitude of a drive signal of this kind form the basic precondition for approximation of the deflection to linear movement of the target point depending on time.

It is known in the art to use harmonic analysis, i.e., the determination of Fourier coefficients, for the purpose of the resultant approximation of a triangular wave. A scanning device of this kind with associated control unit is described, e.g., in DE-OS 4322694. In this case, control signals are generated on the basis of two of the Fourier components, giving a relatively good resultant approximation of a triangular wave. The type of control shown in this case disadvantageously leads to unsatisfactory results because the two frequencies are treated differently by the scanner according to amplitude and phase. This is the case even when additional harmonics of the fundamental frequency are used for additional correction. In other words, the solution suggested in this case is not suitable for realizing the desired linearization.

In the publication mentioned above, two resonant scanners and a galvanometer scanner are provided for deflection of the laser beam in the x-axis, wherein the galvanometer scanner is used to superpose a DC oscillating movement on the resonant movement supplied by the resonant scanners. As is well known, the oscillating movement of a resonant scanner is caused to a great extent by the exchange of energy between the motion of a mass, especially the mirror, and the deflection of an elastic element, such as a spring, to which the mass is attached.

In a departure from the construction described thus far according to which a plurality of separate scanners are operated within the scanning device, each with its own resonant frequency, it is known to operate an individual scanner with a plurality of resonant frequencies. For example, U.S. Pat. No. 4,859,846 describes the operation of a scanner which works with a mirror and generates a plurality of resonant frequencies for this scanner by means of a suitable control system. This system is also a resonant scanner system. This solution is also unsuitable for overcoming the disadvantage that the actual deflection position is falsified by the position predetermined by the control signal because of various interfering influences, e.g., external temperature influences, influencing variables associated with material, etc.

OBJECT AND SUMMARY OF THE INVENTION

Therefore, the primary object of the invention is to further develop the control system for a scanner drive of the kind mentioned above in such a way that the accuracy of the actual deflection position and of the linearity of the deflection is increased while retaining the advantageous generation of a control signal based on a triangular wave.

According to the invention, this object is met in that the measurement value transducer is connected with the function generator by way of a logic unit for determining correction values for the exciting current. Accordingly, it is advantageously possible, by evaluating the information supplied by the measurement value transducer about the actual deflection position of the oscillating mirror, to determine correction values with the assistance of the logic unit. These correction values can be used, in turn, to influence the control frequencies emitted by the function generator in such a way that deviations are minimized or completely prevented. In this respect, the solution according to the invention provides a control of the scanning movement which detects deviations of the actual deflection position of the mirror from the position provided by the control frequency and exerts influence on the further controlling of the oscillating mirror by appropriately changing the exciting current.

In an advantageous construction of the invention, at least one signal output of the function generator is connected with an associated signal output of the logic unit for conveying reference signals and comparison signals. In this way, it is ensured that the control frequencies serving as a basis for a comparison with the actual deflection of the mirror and with the response frequency of the mirror to the control frequency are also available in the logic unit.

A first computing circuit for converting the information about the deflection positions of the oscillating mirror according to amplitude and phase of the scanner drive with reference to a plurality of control frequencies should be provided in the logic unit. The results can be represented in the form of a Bode diagram.

Further, a second computing circuit should be provided in the logic unit for determining the values of $k_1 \ldots k_n$ and $\phi_1, \ldots \phi_n$ for the Fourier frequencies in the following series:

$$y=4/n * [k_1 sin(x+\phi_1)(p_1)-k_2 sin(3x+\phi_2)3^2+k_3 sin(5x+\phi_3)/5^2-+\ldots],$$

where $k_1$ to $k_n$ represent the correction factors, x represents the deflection angle, and $\phi_1$ to $\phi_n$ represent the phase angles. This computing circuit makes possible a harmonic analysis of the response movement of the deflecting mirror and the determination of the Fourier coefficients $k_1$ to $k_n$. For this purpose, the response frequency is broken down into a sum of pure oscillations (harmonic oscillations) and a constant component.

Further, a third computing circuit should be provided in the logic unit for modelling a corrected control function from the comparison of actually reached deflection positions with the desired deflection position. The modelling of a corrected control function is carried out on the basis of correction values derived from this comparison. For this purpose, the coefficients $k_1$ to approximately $k_5$ are locked into the control function for small phase errors and deviations $\Delta\phi_1$ to approximately $\Delta\phi_5$ are locked into the control function for large phase errors.

The corrected control commands which are calculated by taking into account the correction values in the logic unit are compiled in corresponding data sets, sent to the function generator, and initially stored therein. A highly precise correction of the control frequency is ensured by taking into account in this way the correction values for the first to the fifth resonant frequency.

In a further preferred construction of the invention, an analog-to-digital converter is provided in the signal path between the measurement value transducer and the logic unit, and a digital-to-analog converter is provided in the signal path between the function generator and the control unit for supplying the oscillating drive. A digital signal processor can be provided as an analog-to-digital converter. This ensures a conversion of the analog signals sent by the measurement value transducer into the digital signals required by the logic unit and, correspondingly, a conversion of the digital frequency signals sent by the function generator into analog signals for preparation for the control unit.

Further, in an advantageous manner, the logic unit, the function generator, the analog-to-digital converter, and the digital-to-analog converter should each be connected with a clock generator. In this way, it is possible to send the information supplied by the measurement value transducer about the response frequency to the logic unit and the corrected control commands to the function generator and the control commands for the following scanning process in a synchronized manner.

A galvanic drive should be provided as oscillating motor. In this way, a defined oscillating movement of the oscillating mirror provided by the exciting energy can be realized. A capacitive angle measurement system should be provided as measurement value transducer. This angle measurement system should be designed in such a way that it is configured for the detection of position values of the oscillating mirror in both scanning directions, i.e., for both the forward movement and returning movement of the galvanic drive. This has the advantageous result that the bidirectional position values are present at the input of the logic unit via the digital signal processor, and the image formation time can thus be reduced by approximately half in comparison with a scanning process in only one direction, i.e., the forward movement and returning movement of the scanner can be utilized; smaller deviations which may occur can be made identical for the forward movement and the returning movement.

The invention is explained more fully hereinafter with reference to an embodiment example.

DESCRIPTION OF THE PREFERRED EMBODIMENTS

Figure 1:
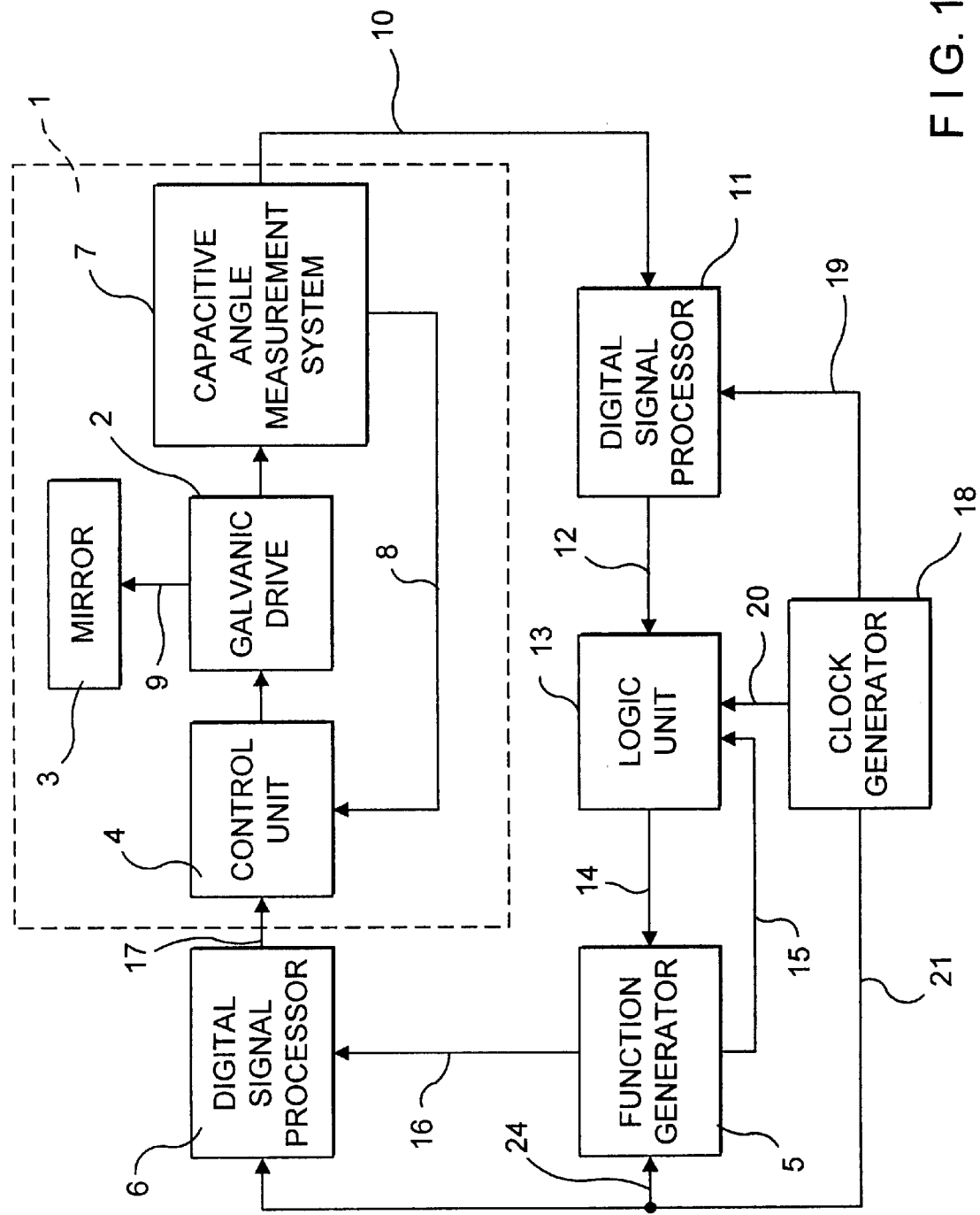
FIG. 1 a schematic wiring diagram of the control system according to the invention.

According to the embodiment example shown in FIG. 1, a galvanic drive 2, an oscillating mirror 3 which is coupled with the galvanic drive 2 by a mechanical connection 9, a control unit 4 whose output communicates with the control input of the galvanic drive 2, and a capacitive angle measurement system 7 which serves to determine the phase-dependent mirror position are provided in a scanner 1. Further, there is a function generator 5 which is connected with the signal input of a digital signal processor 6 via a signal path 16, while the output of the signal processor 6 is applied to the command input of the control unit 4 via a signal path 17. A first output of the capacitive angle measurement system 7 is connected, via a regulating path 8, with a control input of the control unit 4.

The control unit 4 is designed in such a way that it supplies the galvanic drive 2 with an exciting current which is variable with respect to its frequency, oscillation shape, and amplitude. The function generator 5 is designed in such a way that it can generate a plurality of different frequencies which can be impressed in the control unit 4 on the control voltage for the galvanic drive 2 via the signal path 16, the digital signal processor 6, and the signal path 17 in an individually selected manner. The control voltage is based on a synthetic mesh voltage or delta voltage (see FIG. 2 and FIG. 3) which contains only frequencies that can be processed by the galvanic drive 2. Specifically, it is assumed, for example, that forty-two different frequencies up to a maximum of 5 kHz are available to be called up in the frequency generator 5.

During the operation of this arrangement, the galvanic drive 2 transmits every frequency contained in the exciting current or in the control voltage to the oscillating mirror 3 via the mechanical connection 9, since the fundamental frequency and all harmonics produce a response which changes with the respective gain and phase displacement and which expresses itself in a correspondingly changed deflection position of the oscillating mirror 3, wherein the respective deflection position corresponds to a position of the laser beam in its path over a line scanned in the x-direction. It is assumed by way of example that 1,200 deflection positions are to be scanned on every path along the x-direction, wherein one picture point in the object plane is assigned to each deflection position.

The deflection position occupied by the oscillating mirror 3 in each instance corresponds to a position value which is represented by the capacitive angle measurement system 7 and which is supplied to the control unit 4 over the regulating path 8 and, in case of a discrepancy between the reference value and the actual value of the mirror position from the predetermined or ideally desired deflection position, is immediately used in the control unit 4 for correcting the control signal for the subsequent controlling of the galvanic drive 2. This process, known per se, corresponds to a conventional regulation.

However, in order to realize very short image formation times, especially in the range of less than 1s, the synthetic delta voltage which is made available and which initiates the scanning movement must be adapted as far as possible to the response behavior of the scanner according to amplitude and phase, so that a highly precise deflection of the oscillating mirror 3 is ensured based on the control voltage shape. This means that the transmission factor of the control function with respect to the response movement must be approximated to the value of 1 as far as possible and the deviation between the control function and response movement must accordingly be limited to a minimum, for example, <0.5 pixels. In order to achieve this, the control system shown up to this point, which is based on regulation of the control frequency, is supplemented according to the invention by a logic unit 13 whose command input is connected, via signal path 12, a second digital signal processor 11, and signal path 10, with a second output of the capacitive angle measurement system 7. The output of the logic unit 13 is connected via a signal path 14 with a control input of the function generator 5. An additional coupling between the function generator 5 and the logic unit 13 is formed by the signal path 15 for transmitting reference signals and comparison signals from the function generator 5 to the logic unit 13. Further, a clock generator 18 is provided, which clock generator 18 is connected with the second digital signal processor 11 via signal path 19, with the logic unit 13 via signal path 20, with the function generator 5 via signal path 24, and with the first digital signal processor 6 via signal path 21.

Before starting the actual scanning operation, for example, in a laser scanning microscope, this circuit arrangement can be used first to test the entire control system for system errors and to calibrate it while taking into account system errors in such a way that a highly accurate deflection of the oscillating mirror 3 is possible depending on the predetermined frequency. For the purpose of this process referred to as calibration, all of the frequencies prepared 42 by the function generator 5 are first called up one after the other and scanning processes are initiated with these frequencies. For this purpose, the digital signal processors 6 and 11, the function generator 5, and the logic unit 13 are synchronized by the clock generator 18. The response received by the logic unit 13 is evaluated and analyzed in the form of a Bode diagram, wherein the Bode diagram enables the determination of a phase angle and an associated transmission factor for every frequency of the Fourier coefficients. Based on the determined phase angle and the transmission factors, it is possible to synthesize control functions for scanner frequencies within a wide range (1/64 Hz ... ≈600 Hz) which are utilized for a corrected control frequency for the galvanic drive 2 with that of the capacitive angle measurement system 7. The data sets which are synthesized in this way for an oscillation and triangular wave are stored in the function generator 5 and can be called up from the latter cyclically. In this way, data sets which take into account the characteristics of the scanning system are available in the function generator 5 as a result of the calibration step. These data sets determine how the scanning drive is to be controlled in order to obtain the desired highly precise periodic deflection.

Further, by means of the accurate scanning operation which is now possible, deviations from the ideal deflection position are determined and corrected control commands are derived therefrom and stored in the function generator for each of the 1,200 individual deflection points of the laser beam by evaluation of the information reported by the capacitive angle measurement system 7 analogous to the above-described calibration step. Subsequently, corresponding to the clock frequency determined by the clock generator, inquiry and further processing of the corrected control data sets is carried out cyclically for achieving highly precise scanning positions.

Figure 2:
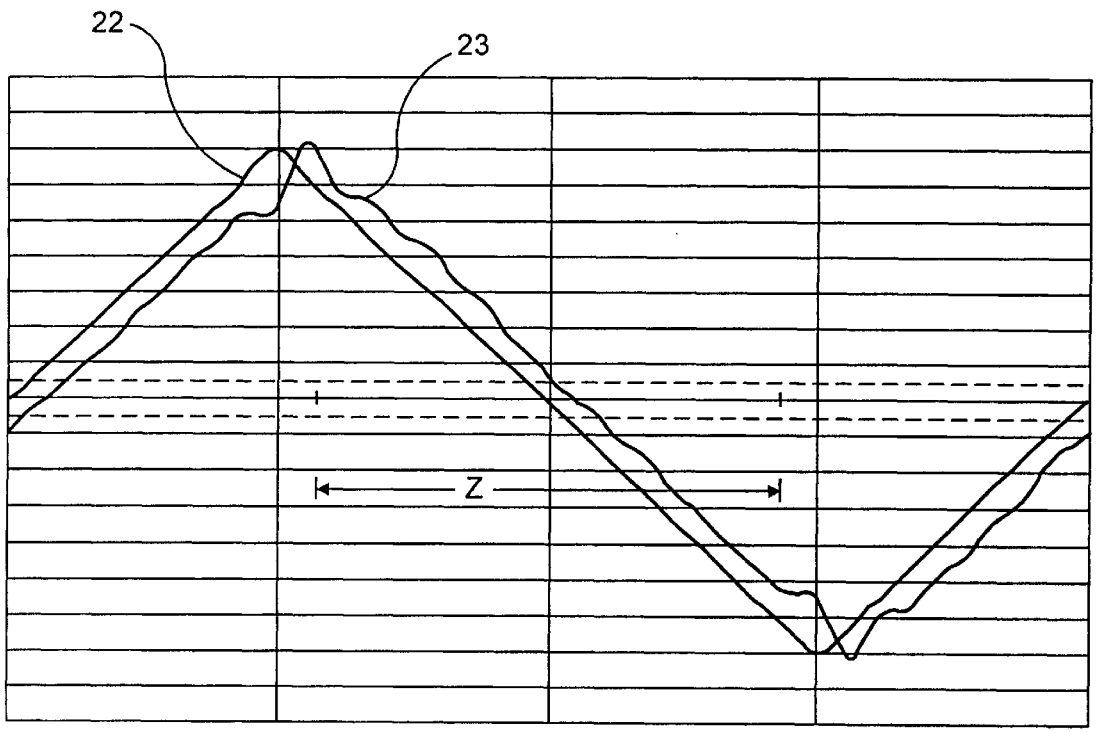
FIG. 2 the shape of an uncorrected control voltage for an image formation time <1s.

FIG. 2 shows the uncorrected control voltage for a specific system in the form of a synthetic delta voltage for the scanning process with an image formation time of 0.75 s. The length z shows the dimensioning of a line to be scanned in the x-direction. Further the triangular wave 22 for the control voltage and the triangular wave 23 for the response movement are shown. It can be seen that the triangular wave 23 does not have its zero crossing at z/2, i.e., the oscillating mirror 3 and accordingly the deflected laser beam do not exactly follow the control voltage predetermined by the triangular wave 22.

Figure 3:
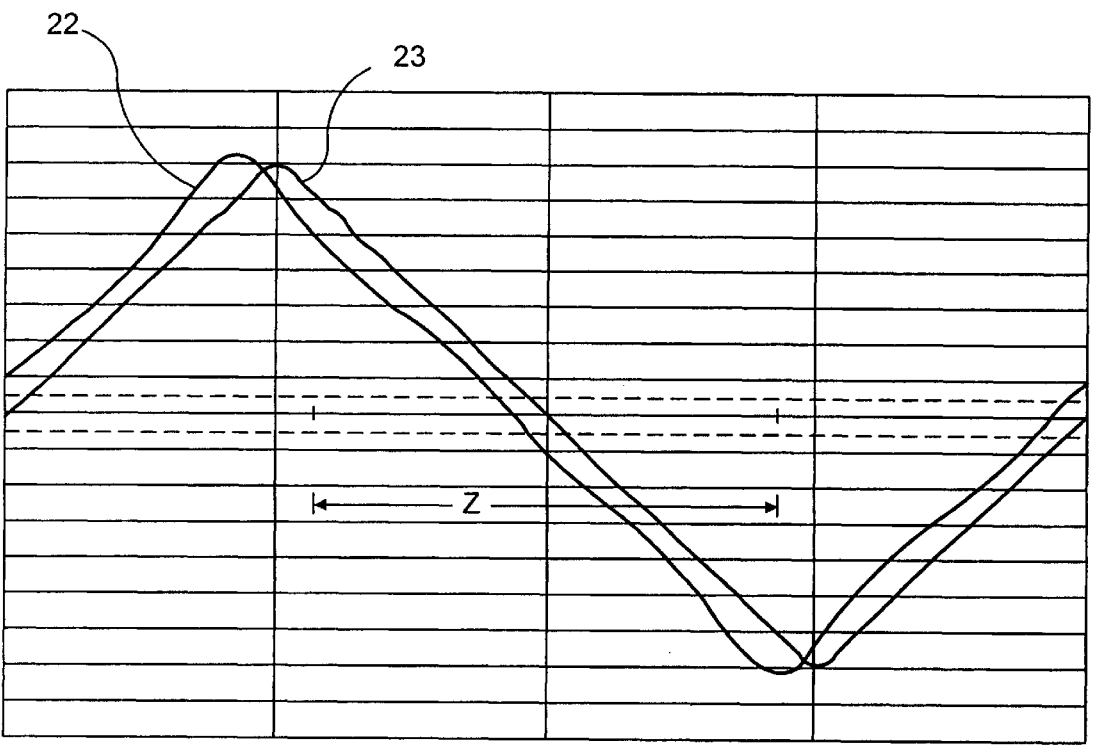
FIG. 3 the shape of the corrected control voltage for the image formation time <1s.

FIG. 3 shows the situation after correction has been carried out. The triangular wave 22 of the response movement is smoothed in particular at the edge near the reversal points and, moreover, now has its zero crossing exactly at z/2.

Synthetic delta voltages having a high mirror symmetry can be realized with this circuit arrangement according to the invention and, consequently, bidirectional scanning with the highest accuracy requirements is made possible.

While the foregoing description and drawings represent the present invention, it will be obvious to those skilled in the art that various changes may be made therein without departing from the true spirit and scope of the present invention.

Reference Numbers 1 scanner
2 oscillating drive
3 oscillating mirror
4 control unit
5 frequency generator
6 first digital signal processor
7 capacitive angle measurement system
8 regulating path
9 mechanical connection
10 output of the angle measurement system
11 second digital signal processor
12 signal path
13 logic unit
14, 15, 16, 17, 19, 20, 21, 24 signal paths
18 clock generator
22 triangular wave control frequency
23 triangular wave response frequency
z line length

What is claimed is:

1. A control system for a scanner drive comprising:
an oscillating motor for driving an oscillating mirror for providing linearly oscillating deflection of a beam bundle;

a control unit for supplying the oscillating motor with exciting current which is variable with respect to the control frequency, triangular wave and amplitude;

a function generator being connected with the control unit;

a measurement value transducer for obtaining a sequence of information about the deflection positions of the oscillating mirror; and a logic unit connecting the measurement value transducer with the function generator for determining correction values for the exciting current, the logic unit determining the values of $k_1 \ldots k_n$ and $\phi_1 \ldots \phi_n$ for the Fourier frequencies in the following series:

$y = 4/\pi * [k_1\sin(x+\phi_1) - k_2\sin(3x+\phi_2)/3^2 + k_3\sin(5x+\phi_3)/5^2 \ldots -+ \ldots]$, where $k_1$ to $k_n$ represent the correction factors x represents the deflection angle, and $\phi_1$ to $\phi_n$ represent the phase angles.

2. The control system for a scanner drive according to claim 1, wherein at least one signal output of the function generator is connected with an associated signal output of the logic unit for conveying reference signals and comparison signals via signal path.

3. The control system for a scanner drive according to claim 1, wherein the logic unit converts the sequence of information about the deflection positions of the oscillating mirror according to amplitude and phase of the scanner drive with reference to a plurality of control frequencies to provide corrected information.

4. A control system for a scanner drive comprising:

an oscillating motor for driving an oscillating mirror for providing linearly oscillating deflection of a beam bundle;

a control unit for supplying the oscillating motor with exciting current which is variable with respect to the control frequency triangular wave and amplitude;

a function generator being connected with the control unit;

a measurement value transducer for obtaining a sequence of information about the deflection positions of the oscillating mirror; and a logic unit connecting the measurement value transducer with the function generator for determining correction values for the exciting current, the logic unit modelling a corrected control function from the comparison of actually reached deflection positions with the desired deflection position, wherein the modelling of a corrected control function is carried out on the basis of correction values derived from this comparison, and wherein coefficients $k_1$ to approximately $k_5$ are locked into the control function for small phase errors and deviations $\Delta\phi_1$ to approximately $\Delta\phi_5$ are locked into the control function for large phase errors.

5. The control system for a scanner drive according to claim 3, wherein the corrected information provided by the logic unit are provided on the basis of a Bode diagram.

6. The control system for a scanner drive according to claim 4, wherein the logic unit determines correction values for the first to the twentieth harmonic resonant frequency of the control frequency.

7. The control system for a scanner drive according to claim 1, wherein an analog-to-digital converter is provided in the signal path between the measurement value transducer and the logic unit, and a digital-to-analog converter is provided in the signal path between the function generator and the control unit for supplying the oscillating drive.

8. The control system for a scanner drive according to claim 7, wherein a digital signal processor is provided as an analog-to-digital converter.

9. The control system for a scanner drive according to claim 1, wherein the logic unit and the function generator are connected with a clock generator.

10. The control system for a scanner drive according to claim 1, wherein a galvanic drive is provided as oscillating drive.

11. The control system for a scanner drive according to claim 1, wherein a capacitive angle measurement system is provided as the measurement value transducer.

12. The control system for a scanner drive according to claim 11, wherein the angle measurement system is designed for the detection of position values of the oscillating mirror in bidirectional scanning direction and bidirectional position values are present at the input of a logic unit via the digital signal processor.

* * * * *